United States Patent
Doyle

(10) Patent No.: US 8,594,624 B2
(45) Date of Patent: *Nov. 26, 2013

(54) WIRELESS PROVISIONING SOLUTION FOR TARGET DEVICES

(71) Applicant: QUALCOMM Incorporated, San Diego, CA (US)

(72) Inventor: Thomas F. Doyle, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/671,740

(22) Filed: Nov. 8, 2012

(65) Prior Publication Data

US 2013/0065554 A1 Mar. 14, 2013

Related U.S. Application Data

(63) Continuation of application No. 12/506,142, filed on Jul. 20, 2009, now Pat. No. 8,331,923.

(51) Int. Cl.
*H04W 4/00* (2009.01)

(52) U.S. Cl.
USPC ........ 455/406; 455/418; 455/419; 455/414.1; 455/450; 370/338; 379/207.02; 379/201.03

(58) Field of Classification Search
USPC ........ 455/419, 411, 418, 403, 410; 380/2, 30; 379/201.12, 335, 334, 29.01; 725/87, 725/107, 25, 98; 370/351, 522, 526, 217, 370/476, 465; 709/223, 224, 227, 238, 231, 709/219, 228; 348/E7.075
See application file for complete search history.

(56) References Cited

U.S. PATENT DOCUMENTS

| | | | |
|---|---|---|---|
| 6,546,095 B1* | 4/2003 | Iverson et al. | 379/201.12 |
| 8,331,923 B2* | 12/2012 | Doyle | 455/419 |
| 2001/0041591 A1* | 11/2001 | Carroll | 455/557 |
| 2002/0128984 A1* | 9/2002 | Mehta et al. | 705/71 |
| 2002/0187775 A1* | 12/2002 | Corrigan et al. | 455/414 |
| 2003/0103482 A1 | 6/2003 | Van Bosch | |
| 2003/0233329 A1 | 12/2003 | Laraki et al. | |

(Continued)

FOREIGN PATENT DOCUMENTS

| | | | | |
|---|---|---|---|---|
| EP | 2015607 | 1/2009 | | |
| WO | WO2006067281 A1 | 6/2006 | | |
| WO | WO 2006067281 A1 * | 6/2006 | | H04L 12/28 |
| WO | WO2007091699 | 8/2007 | | |

OTHER PUBLICATIONS

International Search Report and Written Opinion—PCT/US2010/042622, International Search Authority—European Patent Office—Sep. 27, 2010.

*Primary Examiner* — Mahendra Patel
(74) *Attorney, Agent, or Firm* — Gerald P. Joyce, III

(57) ABSTRACT

Systems and methods to provision a non-handset target device with wide-area communication service, such as wireless wide area network (WWAN) technology. Identifying information of the target device can be provided to a provisioning service provider (PSP) via a mobile provisioning device over a communication network. The PSP can determine the service carrier associated with the mobile provisioning device and enable the provisioning of the target device with the wide-area communication service to the service carrier via the mobile provisioning device. A billing plan can be instituted for the service of the target non-handset device relating to a billing plan of the mobile provisioning device.

46 Claims, 4 Drawing Sheets

(56) References Cited

U.S. PATENT DOCUMENTS

| | | |
|---|---|---|
| 2004/0023647 A1 | 2/2004 | Mazzara, Jr. et al. |
| 2004/0075675 A1 | 4/2004 | Raivisto et al. |
| 2005/0197098 A1* | 9/2005 | Trossen ................ 455/406 |
| 2005/0272408 A1* | 12/2005 | Wilkes-Gibbs et al. ... 455/412.2 |
| 2009/0132487 A1 | 5/2009 | Lev |
| 2010/0056043 A1 | 3/2010 | Burke et al. |
| 2010/0099390 A1 | 4/2010 | Vendrow et al. |
| 2010/0167696 A1 | 7/2010 | Smith et al. |
| 2010/0229229 A1* | 9/2010 | Kumar et al. ............... 726/7 |

* cited by examiner

WIRELESS PROVISIONING SOLUTION FOR TARGET DEVICES

CLAIM OF PRIORITY UNDER 35 U.S.C. §120

The present application for patent is a continuation of patent application Ser. No. 12/506,142 entitled "WIRELESS PROVISIONING SOLUTION FOR TARGET DEVICES" filed Jul. 20, 2009, pending, and assigned to the assignee hereof and hereby expressly incorporated by reference herein.

FIELD

This invention generally relates to systems and methods to provision a device. More particularly, the systems and methods allow for end user service communication provisioning.

BACKGROUND

Wide-area communication service such as, for example, wireless wide area network (WWAN) or metropolitan area network (MAN) technology, enables users to receive and transmit data using mobile telecommunication and cellular network technologies such as, for example, WiMAX, UMTS, GPRS, and 3G. These cellular and mobile technologies can be offered regionally, nationwide, or globally, and can be provided by a wireless service provider or carrier, usually on a paid basis. A device with a wide-area communication service module can be enabled with wide-area communication connectivity, provided that the user of the device has some form of carrier service with the provider.

In addition to mobile handset devices, an increasing number of non-handset devices such as, for example, laptop computers, are being manufactured with integrated wide-area communication capability. The non-handset devices, like the mobile devices, need to be provisioned depending on the selected carrier to enable wide-area communication capability. Unlike many mobile handset devices, the manufacturer of a non-handset device may not know whether the end user of the device will want to pay for wide-area communication access or, if so, what carrier the user will employ in conjunction with the service.

Non-handset devices can have integrated multi-carrier modules which allow the devices to be manufactured without concern for carrier selection. A user can then select a carrier during the sales or distribution processes and the device can subsequently be provisioned. However, if the user does not select a carrier during the sales or distribution processes, then the device ends up with the user without having been provisioned. A problem results if the user later wishes to have wide-area communication capability because the user often does not have the capability to have the device provisioned.

A need therefore exists for systems and methods for end user provisioning.

SUMMARY

Implementations are directed to systems and methods for provisioning a target device. According to implementations in one regard, identifying information relating to the target device is detected. In operation, the detected identifying information is provided to a provisioning service provider (PSP) via a provisioning device having communications capability on a carrier. Various implementations further related to enabling a provisioning of communication service on the target device to the carrier of the provisioning device.

BRIEF DESCRIPTION OF THE DRAWINGS

The accompanying drawings, which are incorporated in and constitute a part of this specification, illustrate implementations of the present disclosure and together with the description, serve to explain the implementations.

DETAILED DESCRIPTION

Figure 1:
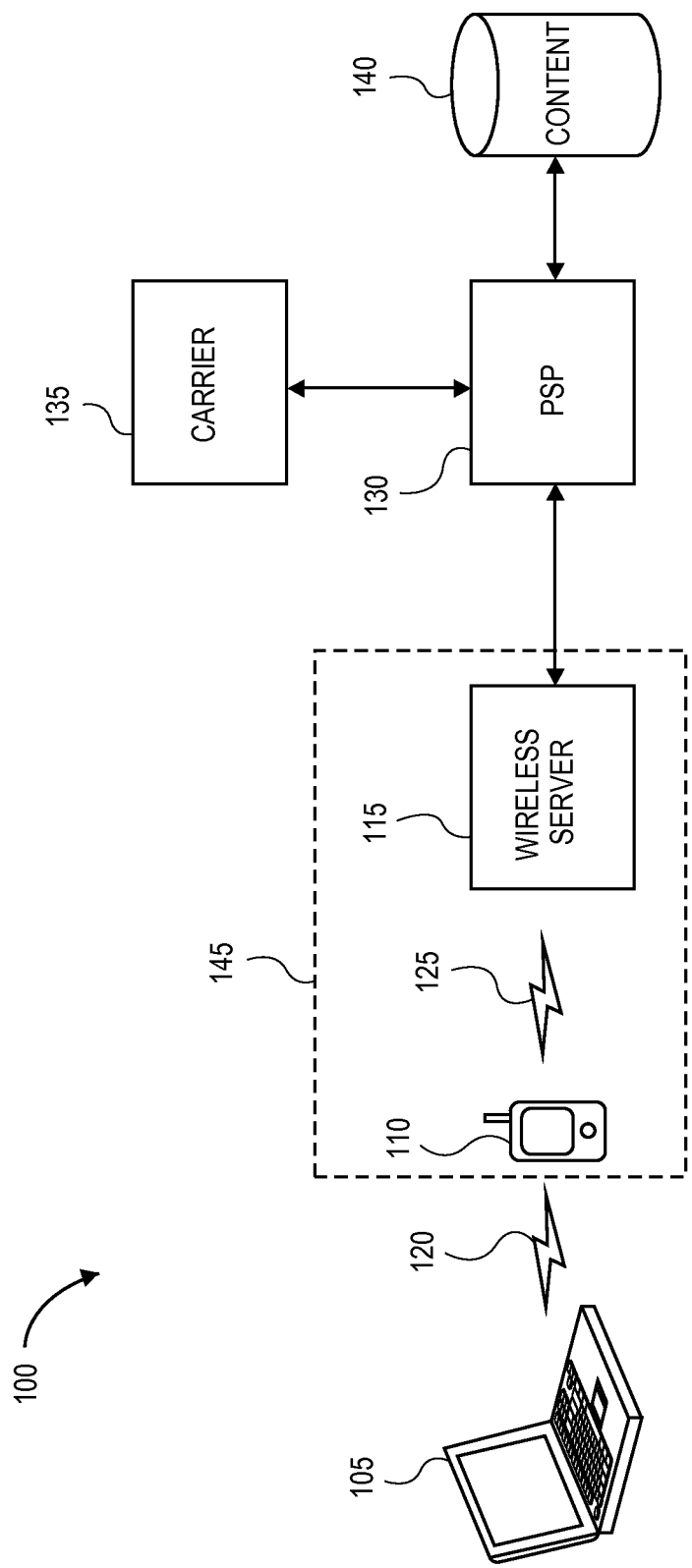
FIG. 1 illustrates a functional block diagram of an exemplary provisioning system according to various implementations.

Implementations are directed towards systems and methods to provision a target device with service communication capability. In particular, the systems and methods can provision a target device with wide-area communication capability, but it should be appreciated that the systems and methods can also be used for provisioning to other types of service communication. The systems and methods can allow the device to reach the consumer before the device is provisioned by allowing for the device to be provisioned via a handset or mobile device with an existing service carrier. The systems and methods according to the present teachings can be implemented as software or hardware on new or existing devices, and/or on new or existing provisioning service providers (PSP).

Mobile devices or handsets as described herein can be understood to be mobile consumer devices such cellular phones, PDAs, mobile messaging devices, or other devices capable of mobile or wireless communication and typically carried with the user. The target devices to be provisioned, or non-handset devices, as described herein can be understood to be consumer devices such as laptops, gaming consoles, DVR recorders, or other similar devices not typically carried with the user. It should be appreciated, however, that the target device to be provisioned can be a handheld or mobile device, wherein the provisioning process can occur via a device with an existing service carrier. For example, a non-provisioned cellular phone can be provisioned by using another cellular phone with an existing service carrier according to the implementations as described herein. Both the handset and non-handset devices can be capable of wired or wireless forms of communication such as, for example, WWAN, cellular, wireless (WiFi), Ethernet or other wired communication, Bluetooth, and/or other communication means.

In implementations as described herein, a target non-handset device with wide-area communication capability can be provisioned at the consumer end to allow associated services such as, for example, the delivery of content and the allowance of other wireless communication. A handset, or mobile, device with an existing service carrier can be used to provision the target non-handset device with wide-area communication service of the existing service carrier. Information relating to wide-area communication hardware and software of the target non-handset device can be accessed and sent to a PSP via the mobile device.

The PSP can retrieve or detect provisioning and service information upon receipt of the information from the mobile device. The PSP can further provision the non-handset device with associated wide-area communication services to the existing service carrier of the mobile device. In implementations, the PSP can employ a price plan based on one or more options chosen by or selected for the consumer. It should be appreciated that the provisioning is not limited to wide-area communication services. Rather, the target device can be provisioned with other communication service capability, such as, for example, a subscription WiFi or Ethernet service, or the like, according to the embodiments described herein.

Reference will now be made in detail to exemplary implementations of the disclosure, an example of which is illustrated in the accompanying drawings. Wherever possible, the same reference names and numbers will be used throughout the drawings to refer to the same or like parts.

In the following description, reference is made to the accompanying drawings that form a part thereof, and in which is shown by way of illustration-specific exemplary implementations. These implementations are described in sufficient detail to enable those skilled in the art to practice the implementations, and it is to be understood that other implementations can be used and that changes can be made without departing from the scope of this disclosure. The following description is, therefore, merely exemplary.

FIG. 1 illustrates a block diagram of an exemplary provisioning system 100 consistent with various implementations. As shown in FIG. 1, system 100 can include a wireless server 115. Wireless server 115 can provide cellular telephony or other digital communications services to users of mobile electronic devices, such as a provisioning device 110. In implementations, provisioning device 110 can be a mobile device such as a cellular phone, a PDA, a mobile messaging device, or other handset devices capable of mobile or wireless communication. Wireless server 115 can be a cellular telephone service provider, a personal communications services (PCS) provider, or a provider of other wireless services. Wireless server 115 can operate in conjunction with a wireless services provider and a set of localized base stations (not shown in figures). In implementations, wireless server 115 can be substituted for any communication vehicle capable of sending data such as, for example, the Internet, an Intranet, a telecommunications network, and the like.

As shown in FIG. 1, provisioning device 110 may communicate data with wireless server 115 using a client-server software architecture over a wireless interface 125 through the set of localized base stations. The data can comprise any type of data capable of being transmitted via the wireless server 115 such as, for example, content associated with wide-area communication services, and the like. Provisioning device 110, wireless interface 125, and wireless server 115 can together comprise a wireless communication network 145 consistent with various implementations described herein.

System 100 can further include a target device 105 that can be provisioned to a service carrier. Target device 105 can be a non-handset device such as, for example, a laptop, a gaming console, a DVR recorder, or another non-handset device capable of mobile or wireless communication. Target device 105 can send data to and receive data from provisioning device 110 via a provisioning interface 120. For example, target device 105 can provide identifying data such as a serial number, password, or other unique information which can identify target device 105. In implementations, provisioning interface 120 can be any type of connection necessary to enable the transfer of data such as, for example, a WiFi network, a cellular network, Bluetooth, a hard-wired connection such as Ethernet, and other types of connections.

System 100 can further include a PSP 130 which can connect to wireless communication network 145. PSP 130 can be a part of or operated by a carrier of wireless communication network 145 and/or service associated with provisioning device 110. PSP 130 can provide provisioning information to target device 105 via provisioning device 110 from information received via wireless communication network 145. For example, PSP 130 can receive identifying information associated with target device 105, a connectivity request associated with wide-area communication service, carrier information associated with provisioning device 110, and other information. It should be understood that data communication via PSP 130 shall not be limited to a wireless communication network 145. Rather, PSP 130 can send and receive information via the Internet, an Intranet, a telecommunications network, and other types of communication.

PSP 130 can be connected to and receive carrier data and other configuration information from one or more carriers 135. For example, PSP 130 can interface with an appropriate carrier 135 based on a carrier of provisioning device 110. The carrier 135 can be a service provider capable of providing wide-area communication service, or other voice or data service, to target device 105. PSP 130 can receive provisioning parameters consistent with carrier 135 from carrier 135. In implementations, PSP 130 can be connected to a database 140 that can store and transmit content data relating to wide-area communication service, or other voice or data service, consistent with an appropriate service carrier and/or connectivity request. In implementations, database 140 can be a part of or separate from PSP 130 and/or carrier 135.

Figure 2:
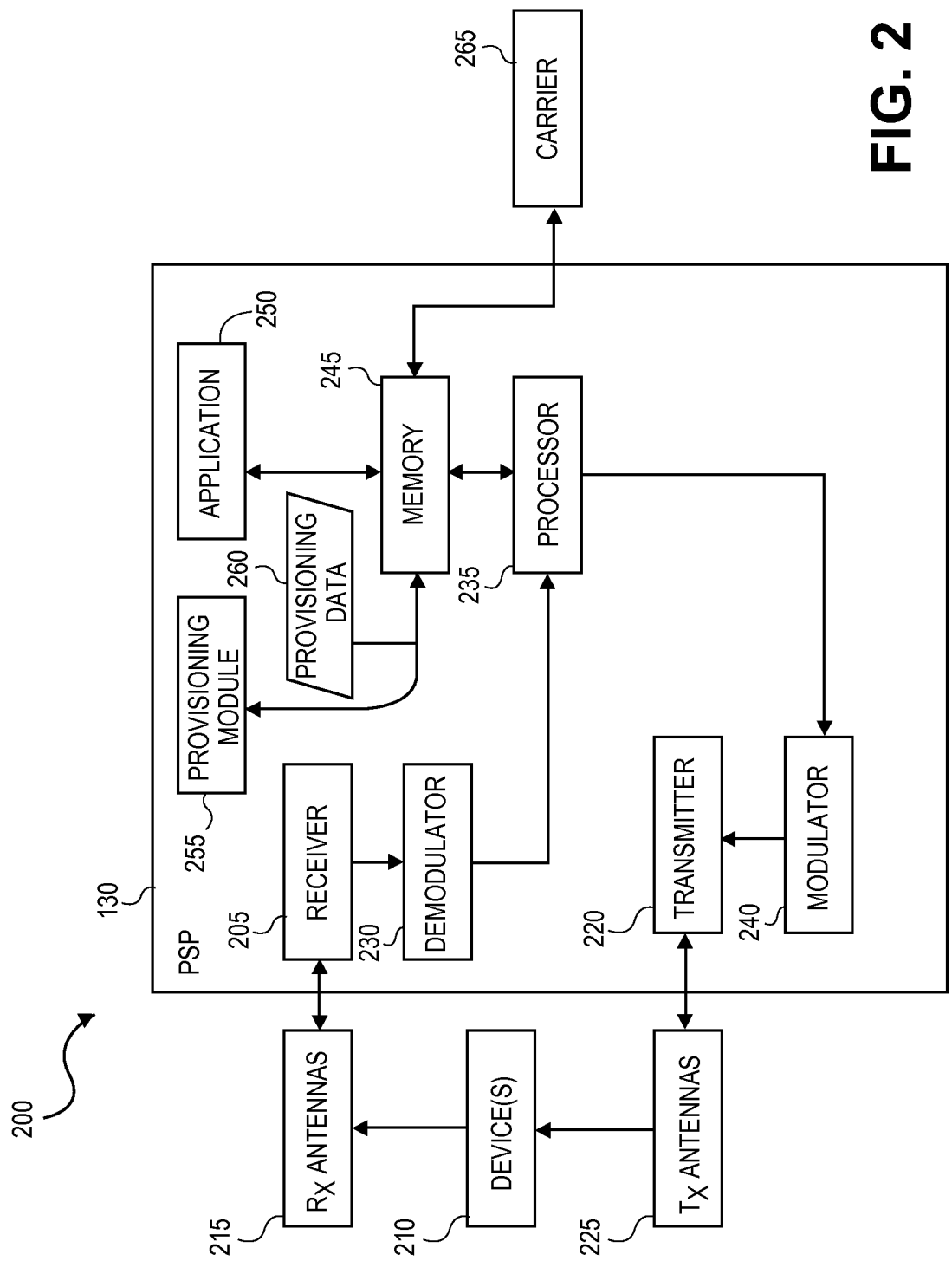
FIG. 2 illustrates an exemplary hardware configuration of a provisioning service provider (PSP) system according to various implementations.

FIG. 2 illustrates an exemplary hardware configuration of a PSP system 200 according to various implementations. System 200 comprises PSP 130 with a receiver 205 that receives signal(s) from one or more mobile devices 210 through a plurality of receive antennas 215, and a transmitter 220 that transmits to the one or more mobile devices 210 through a transmit antenna 225. Receiver 205 can receive information from receive antennas 215 and can be operatively associated with a demodulator 230 that demodulates received information.

A processor 235 can analyze demodulated signals provided by demodulator 230. The processor 235 further couples to a modulator 240 and a memory 240 that can store a set of applications 250 that can execute, support, facilitate and/or participate in communication activities as described herein. A provisioning module 255 can initiate provisioning capabilities and communicate provisioning data 260 in accordance with implementations described herein. In implementations, provisioning module 255 can receive provisioning data 260 from an external carrier 265 either directly or via memory 245.

Figure 3:
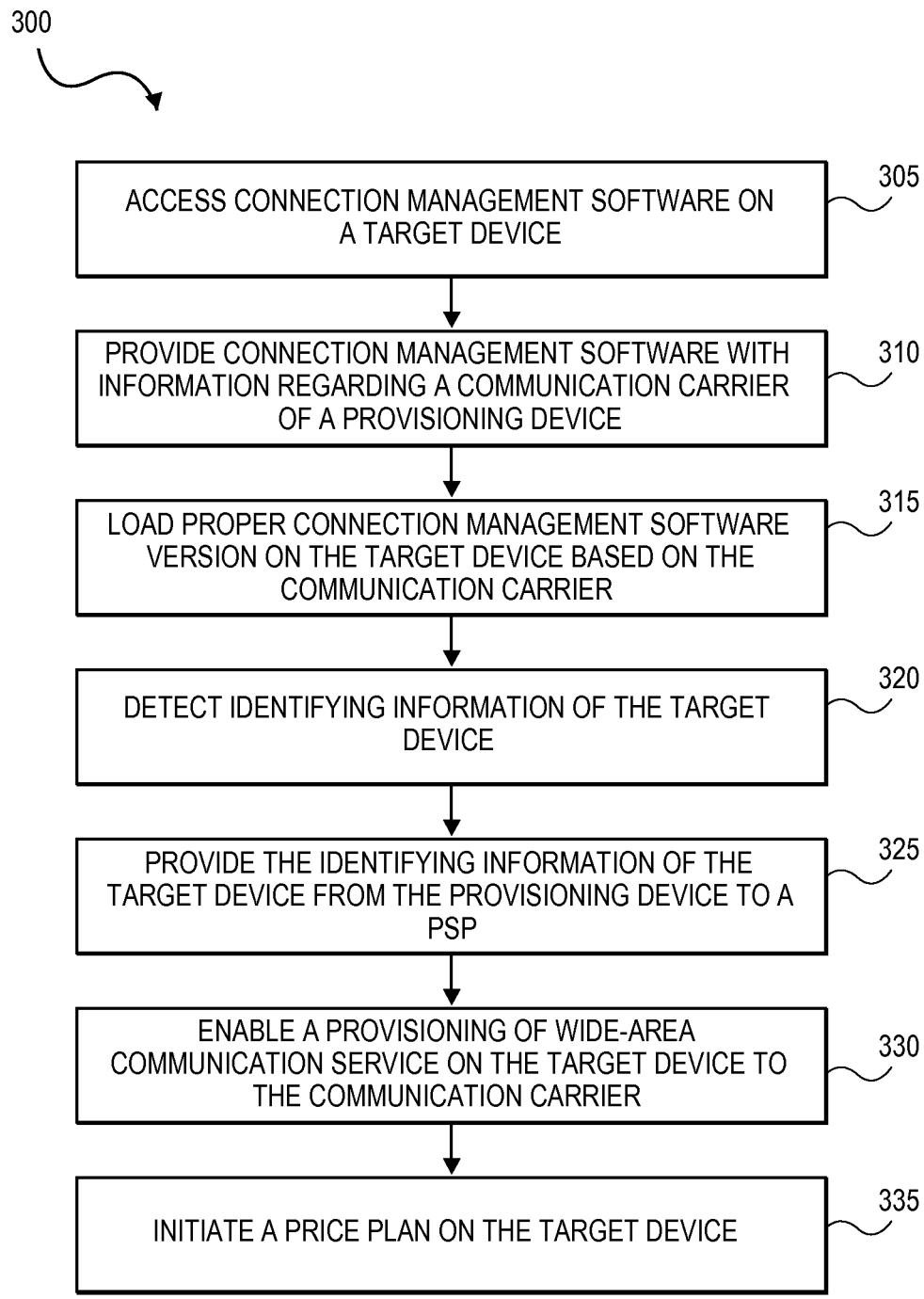
FIG. 3 is a flow diagram illustrating a process of provisioning a device according to various implementations.

FIG. 3 is a flow diagram illustrating a process 300 of provisioning a target non-handset device. Process 300 can be performed by a non-handset device to be provisioned (target device) in conjunction with a handset (provisioning device). It should be apparent to those of ordinary skill in the art that the diagram depicted in FIG. 3 represents a generalized illustration and that other processing may be added or existing processing can be removed or modified.

The process may begin either by accessing provisioning software on the provisioning device, or by accessing connection management software on the target device, in 305. In implementations, the connection management software can act as a gateway in the provisioning and functionality of associated services of wide-area communication connectivity on the target device. The target device and provisioning device can have the ability to communicate with each other, for example through a Bluetooth connection, whereby information for the process can be exchanged automatically. In implementations, if the target device and provisioning device are unable to directly communicate, then an individual who initiated the process can enter information into the target device and the provisioning device manually, for example in response to one or more prompts that can accordingly instruct the individual.

After the process is initiated, the connection management software on the target device is provided with information regarding the communication carrier of the provisioning device either automatically or through manual entry, in 310. Based on the carrier specified, the proper connection management software version is loaded on the target device, in 315. In implementations, the connection management software version can be loaded on an embedded wireless communications module of the target device. Information identifying the target device is detected, in 320. In implementations, the target device can display or otherwise provide a password, serial number, or other information that can identify the embedded wireless communications module and/or the target device. The identifying information of the target device is provided to the provisioning device, either automatically or through manual entry.

The provisioning device sends the identifying information of the target device to a PSP, in 325. In implementations, the identifying information can be sent in an SMS message, where an SMS short code can be used to direct the message to the PSP via a cellular network or other communication network. The SMS message received by the PSP provides the information regarding the carrier of the provisioning device and the identity of the provisioning device, and the content of the message can contain the identifying information of the target device. Further, in implementations, the identifying information can be sent to the PSP via other methods, such as, for example, via a WiFi connection on the provisioning device, in an email sent from the provisioning device, in a web browser on the provisioning device, via a telephone call made on the provisioning device and relayed to an operator or through an automated telephone system, or other types of communication.

Depending on the method of transmission between the provisioning device and the PSP, the PSP may be able to automatically detect the carrier and identification of the provisioning device. In cases where the carrier and/or identification information of the provisioning device cannot be automatically detected, such as, if the provisioning device sends an email message or uses a voice call, then the user can manually enter that information to be provided to the PSP. In implementations, a selection for a price plan for the wide-area communication service can be sent along with the identifying information. If an explicit selection for a price plan is not made, then a default price plan selection can be used for the communication service.

The PSP enables a provisioning of the wide-area communication service on the target device to the selected carrier, in 330. In implementations, the PSP can have one or more business interfaces into the one or more carriers' provisioning services. In implementations, the PSP can enter the identifying information relating to the target device into a local or remote database, or into the one or more business interfaces. In further implementations, the PSP can retrieve provisioning information corresponding to the selected carrier from a local or remote database, or from the one or more business interfaces.

After the target device is provisioned, a price plan can be initiated on the target device, in 335. For example, the price plan can be an unlimited data price plan or a cost per amount of data price plan. In implementations, the price plan can be explicitly selected by a user of the target device in response to attempting a connectivity request. Further, in implementations, the price plan can be an implicit option embedded in the connection management software of the target device. Still further, the price plan selection can be sent from the provisioning device to the PSP along with the original identifying information of the target device such that the target device can have a price plan upon provisioning. For example, the SMS message can include a code identifying a desired price plan, such as a unique code to request connectivity for a single day for a one-time charge to the bill, request a connectivity subscription, thereby generating a recurring charge to the bill, or other connectivity plans. For further example, a price plan can be selected from a web browser on the provisioning device and can be sent to the PSP along with the information identifying the target device. In implementations, the price plan for the target device can be added to a billing account of the existing service of the provisioning device. For example, a user's associated billing account can list both the service price plan for the provisioning device and the service price plan for the target device. In implementations, a linking of the billing account can allow for the bypassing of a credit check for the user of the target device.

Figure 4:
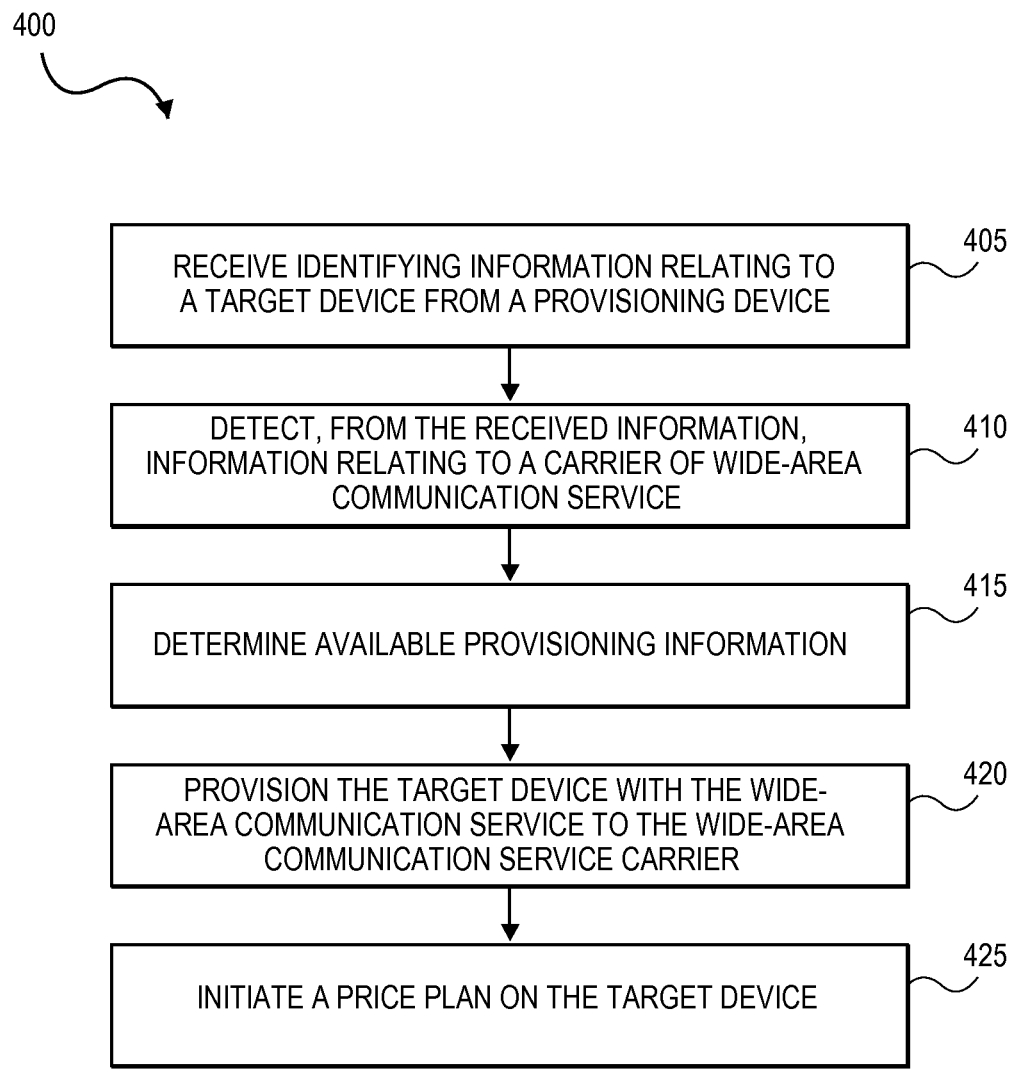
FIG. 4 is a flow diagram illustrating a process of provisioning a device according to various implementations.

FIG. 4 is a flow diagram illustrating a process 400 of provisioning a non-handset device. Process 400 can be performed by a PSP which can receive a provisioning request from the non-handset (provisioning) device. It should be apparent to those of ordinary skill in the art that the diagram depicted in FIG. 4 represents a generalized illustration and that other processing may be added or existing processing can be removed or modified.

Process 400 begins when the PSP receives identifying information relating to the target device from a provisioning device, in 405. In implementations, the information can be a password, serial number, or other information that can identify an embedded wireless communications module or similar component of the target device. In implementations, the identifying information can be sent in an SMS message, where an SMS short code can be used to direct the message to the PSP via a cellular network or other communication network. The SMS message received by the PSP provides the information regarding the carrier of the provisioning device and the identity of the provisioning device, and the content of the message can contain the identifying information of the target device. Further, in implementations, the identifying information can be sent to the PSP via other methods, such as, for example, via a WiFi connection on the provisioning device, in an email sent from the provisioning device, in a web browser on the provisioning device, via a telephone call made on the provisioning device and relayed to an operator or through an automated telephone system, or other types of communication.

The PSP detects, from the received information, information relating to a carrier of wide-area communication service, in 410. In implementations, depending on the method of transmission between the provisioning device and the PSP, the PSP may be able to automatically detect the carrier and identification of the provisioning device. In cases where the carrier and/or identification information of the provisioning device cannot be automatically detected, such as, if the provisioning device sends an email message or uses a voice call, then the user can manually enter that information. In implementations, a selection for a price plan for the wide-area communication service can be sent along with the identifying information. If an explicit selection for a price plan is not made, then a default price plan selection can be used for the communication service.

The PSP determines available provisioning information, in 415. In implementations, the PSP can have one or more business interfaces into one or more carriers' provisioning services. In further implementations, the PSP can retrieve provisioning information from an appropriate carrier based on the carrier selection information, or the PSP can retrieve the provisioning information from local or remote storage. The PSP provisions the target device with the wide-area communication service to the appropriate wide-area communication service carrier, in 420. In implementations, the PSP can enter the identifying information relating to the target device into a local or remote database, or into the one or more business interfaces, which can enable the target device to receive associated communication service.

The PSP initiates a price plan on the target device, in 425. For example, the price plan can be an unlimited data price plan or a cost per amount of data price plan. In implementations, the price plan can be explicitly selected by a user of the target device in response to attempting a connectivity request. Further, in implementations, the price plan can be an implicit option embedded in the connection management software of the target device. Still further, the price plan selection can be sent from the provisioning device to the PSP along with the original identifying information of the target device such that the target device can have a price plan upon provisioning. For example, the SMS message can include a code identifying a desired price plan, such as a unique code to request connectivity for a single day for a one-time charge to the bill, request a connectivity subscription, thereby generating a recurring charge to the bill, or other connectivity plans. For further example, a price plan can be selected from a web browser on the provisioning device and can be sent to the PSP along with the information identifying the target device. In implementations, the price plan for the target device can be added to a billing account of the existing service of the provisioning device. For example, a user's associated billing account can list both the service price plan for the provisioning device and the service price plan for the target device. In implementations, a linking of the billing account can allow for the bypassing of a credit check for the user of the target device.

The foregoing description is illustrative, and variations in configuration and implementation may occur to persons skilled in the art. For instance, the various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary implementations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the elements described herein can also be included within the scope of computer-readable media.

The processing of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

What is claimed is:

1. A method of provisioning a target device by a provisioning device, comprising:
    detecting, at a provisioning device, identifying information relating to the target device;
    providing, from the provisioning device, a provisioning request comprising the detected identifying information related to the target device and carrier information for a carrier of the provisioning device, and wherein providing the provisioning request further includes providing a desired price plan;
    receiving, in response to the provisioning request, provisioning information that enables a provisioning of communication service on the target device to the carrier of the provisioning device, and a price plan for the communication service on the target device; and
    initiating the price plan for the communication service for the target device, wherein the price plan is combined with an existing billing account associated with service on the provisioning device.

2. The method of claim 1, wherein the received price plan is based on the desired price plan.

3. The method of claim 1, wherein the detected identifying information is provided via the carrier of the provisioning device.

4. The method of claim 1, wherein the detected identifying information is provided from the target device to the provisioning device via a communication network.

5. The method of claim 1, wherein the step of providing the detected identifying information relating to the target device via the provisioning device comprises:
sending a short message service (SMS) message from the provisioning device to a provisioning service provider (PSP) via the carrier of the provisioning device.

6. The method of claim 1, wherein the step of providing the detected identifying information relating to the target device via the provisioning device comprises:
providing the detected information relating to the target device and an indication of the carrier of the provisioning device to a provisioning service provider (PSP) via a communication network other than the carrier of the provisioning device.

7. A provisioning device, comprising:
a wireless interface; and
a processor, communicating with the wireless interface, the processor being configured to:
detect identifying information relating to the target device;
provide a provisioning request comprising the detected identifying information related to the target device and carrier information for a carrier of the provisioning device, and wherein providing the provisioning request further includes providing a desired price plan;
receive, in response to the provisioning request, provisioning information that enables a provisioning of communication service on the target device to the carrier of the provisioning device, and a price plan for the communication service on the target device; and
initiate the price plan for the communication service for the target device, wherein the price plan is combined with an existing billing account associated with service on the provisioning device.

8. The device of claim 7, wherein the received price plan is based on the desired price plan.

9. The device of claim 7, wherein the detected identifying information relating to the target device is provided via the carrier of the provisioning device.

10. The device of claim 7, wherein the detected identifying information relating to the target device is provided to a provisioning service provider (PSP) by sending an SMS message from the provisioning device to the PSP via the carrier of the provisioning device.

11. The device of claim 7, wherein the detected identifying information relating to the target device is provided, with an indication of the carrier of the provisioning device, to a provisioning service provider (PSP) via a communication network other than the carrier of the provisioning device.

12. A system for provisioning a target device, comprising:
means for detecting, at a provisioning device, identifying information relating to the target device;
means for providing, from the provisioning device, a provisioning request comprising the detected identifying information related to the target device and carrier information for a carrier of the provisioning device, and wherein providing the provisioning request further includes providing a desired price plan;
means for receiving, in response to the provisioning request, provisioning information that enables a provisioning of communication service on the target device to the carrier of the provisioning device, and a price plan for the communication service on the target device; and
means for initiating the price plan for the communication service for the target device, wherein the price plan is combined with an existing billing account associated with service on the provisioning device.

13. The system of claim 12, wherein the received price plan is based on the desired price plan.

14. The system of claim 12, wherein the detected identifying information relating to the target device is provided via the carrier of the provisioning device.

15. The system of claim 12, wherein the detected identifying information relating to the target device is provided to a provisioning service provider (PSP) by sending an SMS message from the provisioning device to the PSP via the carrier of the provisioning device.

16. The system of claim 12, wherein the detected identifying information relating to the target device is provided, with an indication of the carrier of the provisioning device, to a provisioning service provider (PSP) via a communication network other than the carrier of the provisioning device.

17. A computer program product, comprising:
a non-transitory computer-readable medium comprising:
at least one instruction for causing a computer to detect, at a provisioning device, identifying information relating to a target device;
at least one instruction for causing the computer to provide, from the provisioning device, a provisioning request comprising the detected identifying information related to the target device and carrier information for a carrier of the provisioning device, and wherein providing the provisioning request further includes providing a desired price plan;
at least one instruction for causing the computer to receive, in response to the provisioning request, provisioning information that enables a provisioning of communication service on the target device to the carrier of the provisioning device, and a price plan for the communication service on the target device; and
at least one instruction for causing the computer to initiate the price plan for the communication service for the target device, wherein the price plan is combined with an existing billing account associated with service on the provisioning device.

18. The computer program product of claim 17, wherein the received price plan is based on the desired price plan.

19. The computer program product of claim 17, wherein the detected identifying information relating to the target device is provided via the carrier of the provisioning device.

20. The computer program product of claim 17, wherein the detected identifying information relating to the target device is provided to a provisioning service provider (PSP) by sending an SMS message from the provisioning device to the PSP via the carrier of the provisioning device.

21. The computer program product of claim 17, wherein the detected identifying information relating to the target device is provided, with an indication of the carrier of the provisioning device, to a provisioning service provider (PSP) via a communication network other than the carrier of the provisioning device.

22. A method of provisioning a target device by a provisioning service provider, comprising:
receiving, from a provisioning device, a provisioning request for provisioning a target device comprising identifying information relating to the target device, carrier information for a carrier of the provisioning device, and a desired price plan;
retrieving provisioning information for the carrier of the provisioning device, wherein the provisioning information enables the provisioning of the target device to the carrier of the provisioning device;
initiating the price plan for the communication service on the target device, wherein the price plan is combined with an existing billing account associated with service on the provisioning device; and providing, to the provisioning device, the provisioning information and the price plan for a communication service on the target device.

23. The method of claim 22, wherein the price plan is based on the desired price.

24. The method of claim 22, wherein the identifying information relating to the target device is received via the carrier of the provisioning device.

25. The method of claim 22, wherein the identifying information relating to the target device is provided from the target device to the provisioning device via a communication network.

26. The method of claim 22, wherein the identifying information relating to the target device is received in an SMS message sent from the provisioning device via the carrier of the provisioning device.

27. The method of claim 22, wherein the detected information relating to the target device and an indication of the carrier of the provisioning device is received via a communication network other than the carrier of the provisioning device.

28. A system for provisioning a target device, comprising: a server being configured to:
 receive, from a provisioning device, a provisioning request for provisioning a target device comprising identifying information relating to the target device, carrier information for a carrier of the provisioning device, and a desired price plan;
 retrieve provisioning information for the carrier of the provisioning device, wherein the provisioning information enables the provisioning of the target device to the carrier of the provisioning device;
 initiate the price plan for the communication service on the target device, wherein the price plan is combined with an existing billing account associated with service on the provisioning device; and
 provide, to the provisioning device, the provisioning information and the price plan for a communication service on the target device.

29. The system of claim 28, wherein the price plan is based on the desired price plan.

30. The system of claim 28, wherein the identifying information relating to the target device is received via the carrier of the provisioning device.

31. The system of claim 28, wherein the identifying information relating to the target device is received in an SMS message sent from the provisioning device via the carrier of the provisioning device.

32. The system of claim 28, wherein the detected information relating to the target device and an indication of the carrier of the provisioning device is received via a communication network other than the carrier of the provisioning device.

33. A system for provisioning a target device, comprising:
 means for receiving, from a provisioning device, a provisioning request for provisioning a target device comprising identifying information relating to the target device, carrier information for a carrier of the provisioning device, and a desired price plan;
 means for retrieving provisioning information for the carrier of the provisioning device, wherein the provisioning information enables the provisioning of the target device to the carrier of the provisioning device;
 means for initiating the price plan for the communication service on the target device, wherein the price plan is combined with an existing billing account associated with service on the provisioning device; and
 means for providing, to the provisioning device, the provisioning information and the price plan for a communication service on the target device.

34. The system of claim 33, wherein the price plan is based on the desired price plan.

35. The system of claim 33, wherein the identifying information relating to the target device is received via the carrier of the provisioning device.

36. The system of claim 33, wherein the identifying information relating to the target device is received in an SMS message sent from the provisioning device via the carrier of the provisioning device.

37. The system of claim 33, wherein the detected information relating to the target device and an indication of the carrier of the provisioning device is received via a communication network other than the carrier of the provisioning device.

38. A computer program product, comprising:
 a non-transitory computer-readable medium comprising:
  at least one instruction for causing a computer to receive, from a provisioning device, a provisioning request for provisioning a target device comprising identifying information relating to the target device, carrier information for a carrier of the provisioning device, and a desired price plan;
  at least one instruction for causing the computer to retrieve provisioning information for the carrier of the provisioning device, wherein the provisioning information enables the provisioning of the target device to the carrier of the provisioning device;
  at least one instruction for causing the computer to initiate the price plan for the communication service on the target device, wherein the price plan is combined with an existing billing account associated with service on the provisioning device; and
  at least one instruction for causing the computer to provide, to the provisioning device, the provisioning information and the price plan for a communication service on the target device.

39. The computer program product of claim 38, wherein the price plan is based on the desired price plan.

40. The computer program product of claim 38, wherein the identifying information relating to the target device is received via the carrier of the provisioning device.

41. The computer program product of claim 38, wherein the identifying information relating to the target device is received in an SMS message sent from the provisioning device via the carrier of the provisioning device.

42. The computer program product of claim 38, wherein the detected information relating to the target device and an indication of the carrier of the provisioning device is received via a communication network other than the carrier of the provisioning device.

43. The method of claim 1, wherein the provisioning device is a mobile device.

44. The provisioning device of claim 7, wherein the provisioning device is a mobile device.

45. The system of claim 12, wherein the provisioning device is a mobile device.

46. The computer program product of claim 17, wherein the provisioning device is a mobile device.

* * * * *